United States Patent [19]
Detwiler

[11] Patent Number: 6,082,186
[45] Date of Patent: Jul. 4, 2000

[54] ADJUSTABLE BALANCE WEIGHT

[75] Inventor: Paul O. Detwiler, Lawrenceville, Ga.

[73] Assignee: NCR Corporation, Dayton, Ohio

[21] Appl. No.: 08/844,943

[22] Filed: Apr. 23, 1997

[51] Int. Cl.[7] .................................................. G01M 1/00
[52] U.S. Cl. .......................... 73/66; 74/573 R; 464/180
[58] Field of Search .............................. 73/66, 459, 460,
73/461, 468, 469, 470, 473; 74/573 R,
572, 574; 359/198, 199, 200, 216, 18; 235/470;
464/180

[56] References Cited

U.S. PATENT DOCUMENTS

| | | | |
|---|---|---|---|
| 4,003,265 | 1/1977 | Craig et al. | 74/5 R |
| 4,539,864 | 9/1985 | Wiebe | 74/573 R |
| 4,852,956 | 8/1989 | Kramer | 350/3.71 |
| 4,893,044 | 1/1990 | Bush et al. | 310/261 |
| 5,137,354 | 8/1992 | deVos et al. | 356/152 |
| 5,183,350 | 2/1993 | Kramer | 403/4 |
| 5,367,909 | 11/1994 | Heilman et al. | 73/468 |
| 5,386,163 | 1/1995 | Heilman | 310/51 |
| 5,422,471 | 6/1995 | Plesko | 235/467 |

*Primary Examiner*—Richard A. Moller
*Attorney, Agent, or Firm*—Francis L. Conte

[57] ABSTRACT

A balance weight includes a body having a mounting aperture for receiving a mounting pin, and a guide tab for engaging a complementary guide slot in a rotor. The rotor includes a spinner fixedly joined thereto for rotation therewith, with the spinner having an endwall disposed coaxially about a shaft for defining a balance plane. The mounting pin is disposed at the center of the endwall, with the endwall having a plurality of circumferentially spaced apart guide ribs defining a plurality of the guide slots between adjacent ones thereof. The balance weight is mounted on the spinner endwall, with the mounting aperture thereof receiving the mounting pin, and the guide tab being positioned in one of the guide slots for restraining circumferential movement thereof.

20 Claims, 6 Drawing Sheets

ADJUSTABLE BALANCE WEIGHT

BACKGROUND OF THE INVENTION

The present invention relates generally to barcode scanners, and, more specifically, to dynamically balancing spinners thereof.

A typical barcode scanner reflects a laser beam from a multi-faceted spinner having mirrors which reflect the laser beam toward cooperating pattern mirrors for producing a pattern of scanning lines which are reflected off a conventional barcode attached to a consumer product, for example. The light reflected from the barcode returns through a collection optical system within the barcode scanner wherein it is conventionally decoded for obtaining the corresponding information associated with the scanned item.

Hand-held and relatively simple barcode scanners use a slowly rotating spinner for which the dynamic balance thereof is insignificant. However, other barcode scanners require relatively fast scanning speed, and therefore operate the spinners at higher rotational speeds, which therefore must be dynamically balanced for obtaining smooth operation. The spinner mirrors are relatively large and may be rotated at speeds up to about 8,000 rpm typically requiring dynamic balancing in two axially spaced apart planes.

Dynamic balancing is a conventional process in which a rotor is mounted atop a balancing machine and rotated at a given operating speed. The rotor typically includes two predefined balancing planes, with the balancing machine measuring unbalance thereat and displaying suitable corrections therefor. A balance correction may include the addition or removal of a specific amount of mass, at a specific radius from the centerline of rotation, and at a specific angular position about the rotor in each of the two planes.

In the example of the barcode spinner, the removal of weight at the balance planes is impractical in view of the fragile nature of the spinner rotor. Accordingly, balance correction is typically effected by bonding a lead tape at the required position, or by applying a weighted adhesive in the exemplary form of a hot melt.

In either example, the amount of balance correction is subject to inaccuracy in manually providing the required amount of mass at the correct radial and angular positions. The balanced rotor may be retested to determine the acceptability of the correction, and re-balancing may be required if the originally corrected balance is not within acceptable limits. This process requires trial and error which decreases the efficiency of the process.

Accordingly, it is desired to provide a new system and method for balancing rotors, such as barcode scanner spinners, which reduce or eliminate the need for trial and error balancing.

SUMMARY OF THE INVENTION

A balance weight includes a body having a mounting aperture for receiving a mounting pin, and a guide tab for engaging a complementary guide slot in a rotor. The rotor includes a spinner fixedly joined thereto for rotation therewith, with the spinner having an endwall disposed coaxially about a shaft for defining a balance plane. The mounting pin is disposed at the center of the endwall, with the endwall having a plurality of circumferentially spaced apart guide ribs defining a plurality of the guide slots between adjacent ones thereof. The balance weight is mounted on the spinner endwall, with the mounting aperture thereof receiving the mounting pin, and the guide tab being positioned in one of the guide slots for restraining circumferential movement thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
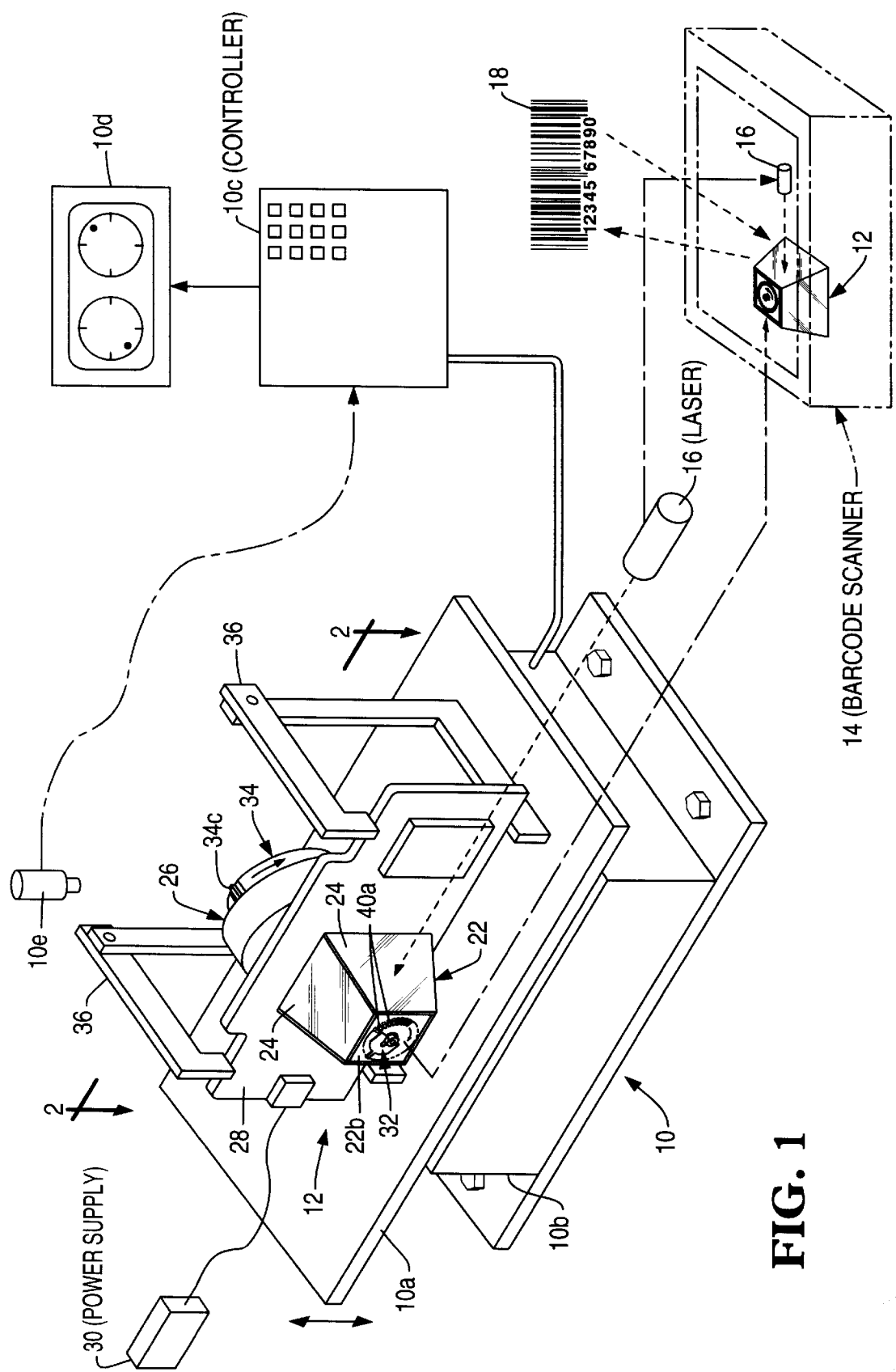
FIG. 1 is a schematic representation of a system for balancing a barcode spinner rotor at two balance planes in accordance with an exemplary embodiment of the present invention.

Illustrated schematically in FIG. 1 is a balance machine 10 specifically configured in accordance with an exemplary embodiment of the present invention for dynamically balancing a spinner rotor 12 for use in a conventional laser barcode scanner 14. The barcode scanner 14 may take any conventional form including therein a conventional laser 16 and the spinner rotor 12 requiring balancing.

In conventional operation of the barcode scanner 14, the laser 16 emits a laser beam which is suitably directed at the spinner rotor 12 which reflects the beam in turn against conventional pattern mirrors (not shown) which then travel through a window for engaging a conventional barcode 18. Light reflected from the barcode 18 returns through suitable collection optics in the scanner 14 and is conventionally decoded for determining the information stored in the barcode 18.

The spinner rotor 12 is illustrated schematically in FIG. 1 both in an exemplary position within the barcode scanner 14 itself, as well as mounted in the balance machine 10 for being dynamically balanced in accordance with the present invention. The spinner rotor 12 is illustrated in more detail in conjunction with FIG. 2 and includes a rotor shaft 20 having first and second opposite axial ends 20a,b. A spinner 22 is suitably fixedly joined to the shaft first end 20a, by adhesive bonding for example, for rotation therewith. Suitably joined around the spinner 22 is a plurality of optically reflective mirrors 24 which are used in the scanner 14 for initially reflecting the beam from the laser 16 during operation.

A conventional electrical motor 26 is operatively joined to the shaft 20 at the second end 20b thereof for rotating the shaft and spinner 22 during operation. In the exemplary embodiment illustrated in FIG. 2, the motor 26 includes a stator coil 26a suitably joined to a frame 28 in the form of a conventional printed circuit (PC) board which contains suitable electronic components for use in the barcode scanner 14. The motor 26 also includes a cylindrical shell 26b fixedly attached to the shaft 20 and surrounding the coil 26a. The shell 26b includes permanent magnets which cooperate with the coil 26a when energized for rotating the shell 26b and in turn the shaft 20 and the spinner 22 attached thereto. As shown in FIG. 1, a suitable power supply 30 is suitably electrically joined to the frame 28 and in turn to the motor coil 26a for providing power thereto for operating the motor 26 and rotating the spinner 22 when desired.

Figure 2:
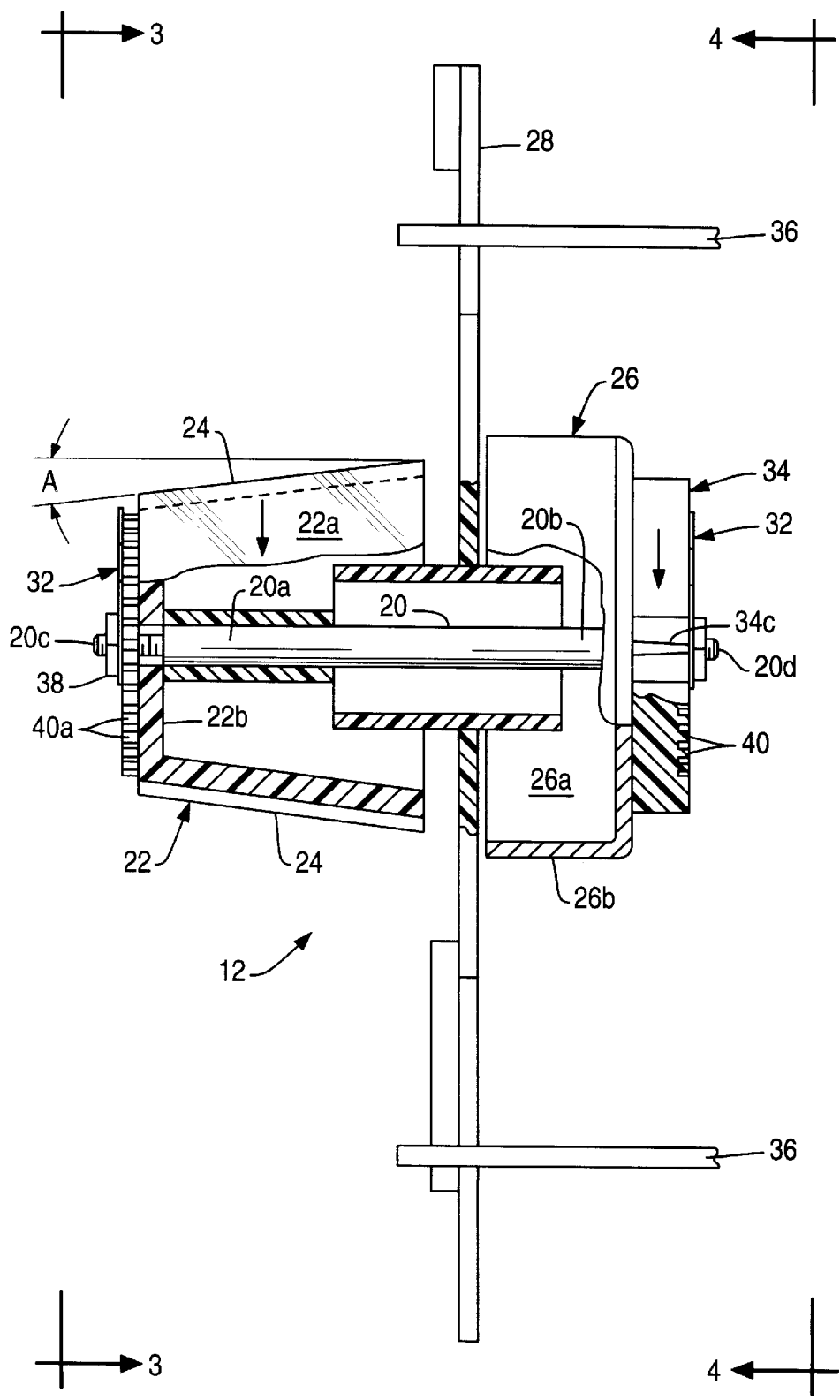
FIG. 2 is a top, partly sectional view of the spinner rotor illustrated in FIG. 1 and taken generally along line 2—2, illustrating a spinner, motor, and guide wheel mounted to a rotor shaft for being balanced at two planes defined at corresponding endwalls of the spinner and guide wheel.

The spinner rotor 12 illustrated in FIGS. 1 and 2 is merely one example of a rotor which may enjoy improved balancing in accordance with the present invention. Except for the features of the present invention as addressed below, the spinner rotor 12 is otherwise conventional. For example, the spinner 22 as illustrated in FIG. 2 includes a plurality of circumferentially adjoining planar sidewalls 22a, for example four in the exemplary embodiment illustrated. The sidewalls 22a define a box and are joined together at a planar first or top endwall 22b. The spinner 22 may be formed of a suitable plastic, for example, and has a center bore which may be suitably adhesively bonded to the outer surface of the shaft 20 for attachment thereto. The corresponding four planar mirrors 24 may be adhesively bonded to respective ones of the sidewalls 22a to define a four-faceted spinner 22.

In the exemplary embodiment illustrated in FIGS. 1 and 2, the shaft 20 is suitably mounted to the frame 28 for high speed rotation relative thereto up to about 8,000 rpm, for example. In the preferred embodiment illustrated in FIG. 2, each of the mirrors 24 is inclined on the spinner sidewalls 22a at different inclination angles A to effect a conventional configuration for producing multiple scan patterns in the scanner 14. Accordingly, the spinner 22 with the mirrors 24 mounted thereon is inherently unbalanced due to the offset mirrors, which unbalance is typically reduced during manufacture of the spinner 22 by varying the thicknesses of the walls thereof thusly reducing the initial unbalance of the spinner 22.

The spinner rotor 12 as thus described may be conventionally dynamically balanced at its opposite ends using conventional lead tape or weighted adhesive if desired (not shown). For example, this would be accomplished by providing the tape or adhesive to the spinner endwall 22b illustrated in FIG. 1 to offset unbalance measured by the balance machine 10.

However, in accordance with the present invention, a specifically configured balance weight 32 as shown in FIG. 1 is instead used for improving balancing of the spinner rotor 12. A first one of the balance weights 32 is suitably mounted to the spinner endwall 22b, and a second one of the balance weights 32 is suitably mounted on the opposite side of the rotor 12 to a guide wheel 34 specifically configured therefor which is suitably coaxially mounted to the motor 26. In this way, conventional two-plane dynamic balancing of the rotor 12 may be effected using the improved balance weights 32 and their cooperating mounts.

The balance machine 10 illustrated in FIG. 1 may take any conventional form such as, for example, model HDR-11.1/C-SEK commercially available from the American Hofmann Corporation, Lynchburg, Va. In the exemplary embodiment illustrated in FIG. 1, the otherwise conventional balance machine 10 includes a pair of specifically configured generally C-shaped clamps 36 which readily mount the spinner rotor 12 and its frame 28 in the balance machine 10.

The clamps 36 are suitably joined to a table 10a mounted to a base 10b through conventional force measuring pickup sensors for detecting unbalance of the spinner rotor 12.

A conventional electrical controller 10c is operatively joined to the force pickup sensors in the table 10a, and includes a conventional central processing unit (CPU) and cooperating electronics which are suitably programmed to control operation of the machine. A conventional visual display 10d is operatively joined to the controller 10c to provide a readout of indicated balance corrections at two planes, with each balance correction being defined at a specific angular position relative to a reference, with a balance correction represented by the product of mass and radial distance from the centerline of rotation.

A conventional optical sensor 10e is operatively joined to the controller 10c and is positioned adjacent to the spinner rotor 12 for measuring rotational speed thereof during the balance operation, and for detecting an angular reference position for the two-plane balance corrections shown in the display 10d.

In balance operation, the power supply 30 is used for rotating the spinner rotor 12 at a given maximum speed without any balance weight 32 being mounted thereon. Any unbalance operation of the spinning rotor 12 is measured by the force sensors in the spring table 10a. In this way, unbalance of the rotor 12 may be measured at the two balance planes associated with the spinner endwall 22b and the guide wheel 34 to determine magnitude and angular position of the required corrections therefor.

Figure 3:
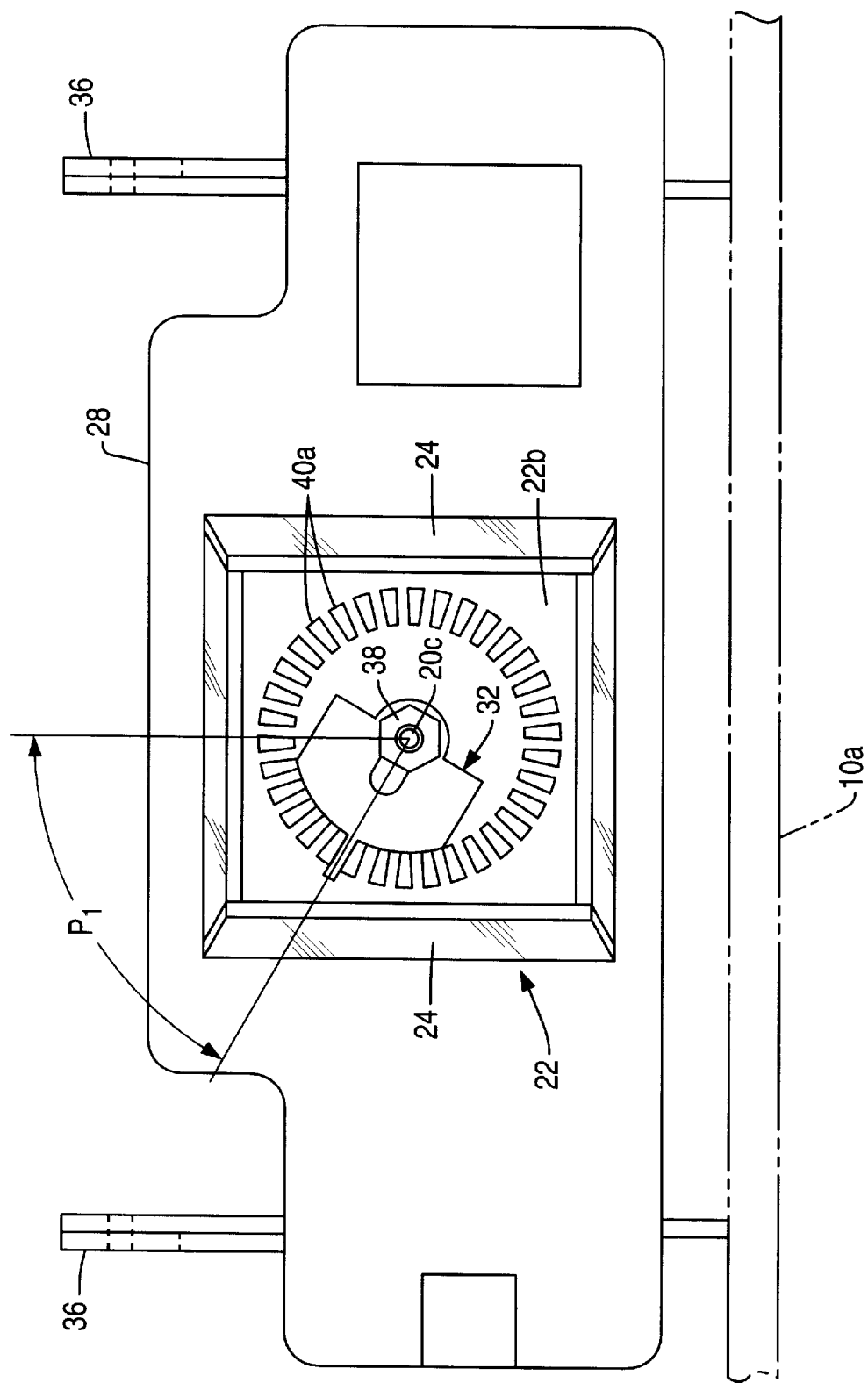
FIG. 3 is a side elevational view of the spinner illustrated in FIG. 2 and taken generally along line 3—3.

FIG. 3 is an end view of the spinner 12 illustrating a first exemplary angular correction position $P_1$ of the balance weight 32 on the spinner endwall 22b for the first balance plane. And, FIG. 4 is an end view of the guide wheel 34 with an exemplary second angular correction position $P_2$ of a corresponding balance weight 32 for the second balance plane associated therewith.

The two balance weights 32 are suitably fixedly mounted on the spinner endwall 22b and on the guide wheel 34 to effect the dynamic correction of the spinner rotor 12 as visually shown in display 10d.

In the exemplary embodiment illustrated in FIGS. 2 and 3, the spinner 12 is conventionally adhesively bonded around the shaft first end 20a, with the corresponding distal end of the shaft 20 defining a first mounting pin 20c which is used in accordance with the invention for mounting the corresponding balance weight 32 thereto. The first mounting pin 20c is preferably threaded for receiving a conventional fastener nut 38 which may be threadingly tightened for compressing the balance weight 32 against the spinner endwall 22b to prevent its inadvertent movement.

Figure 4:
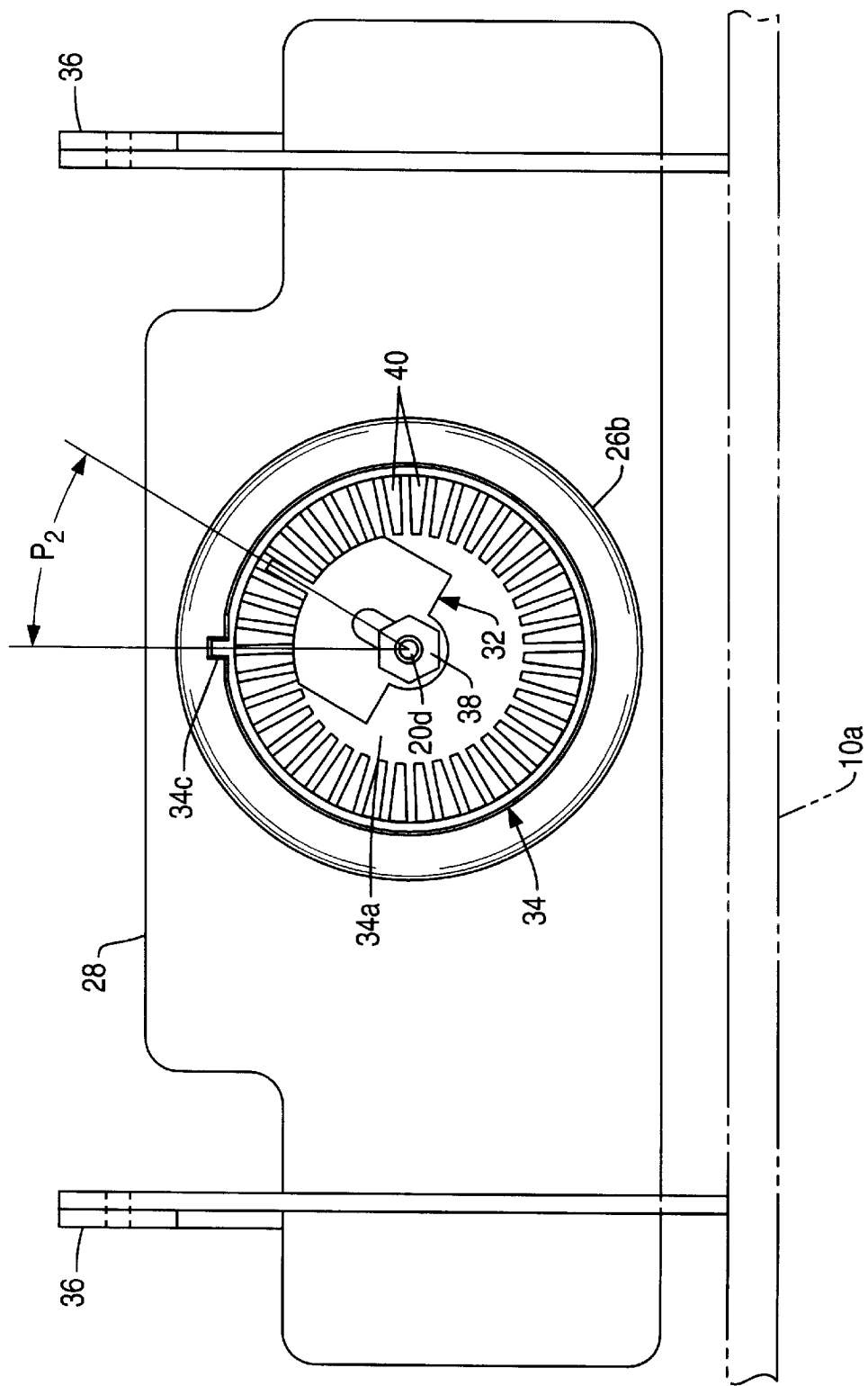
FIG. 4 is a side elevational view of the guide wheel illustrated in FIG. 2 and taken generally along line 4—4.

Similarly, the guide wheel 34 illustrated in FIG. 4 has a corresponding endwall 34a which defines the second balance plane of the spinner rotor 12, and upon which the second balance weight 32 is similarly mounted. Although the second balance weight 32 could be directly mounted to the shell 26b of the motor 26, the use of the separate guide wheel 34 is preferred. In this exemplary embodiment, the distal end of the shaft second end 20b defines a second mounting pin 20d which extends axially from the endwall 34a for mounting the second balance weight 32 thereto using another one of the nuts 38.

Figure 5:
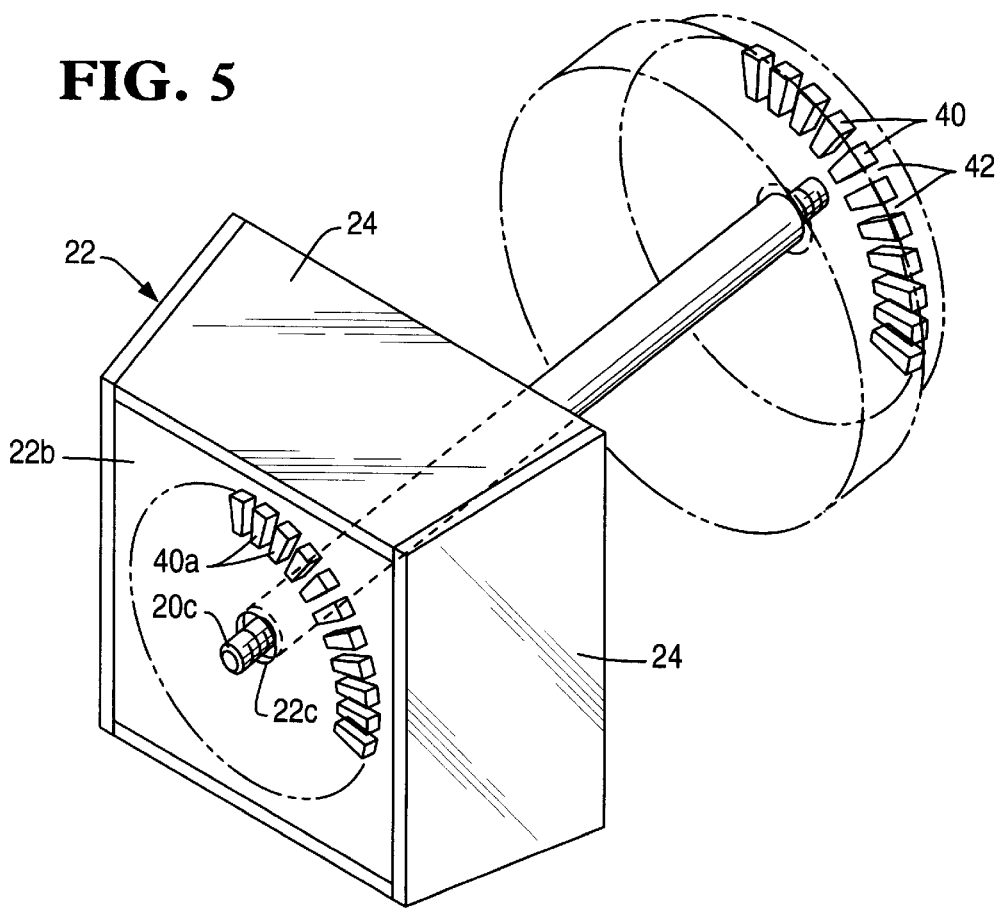
FIG. 5 is an enlarged view of a portion of the spinner endwall illustrated in FIG. 3 showing the guide ribs and slots thereon.

FIG. 5 is an enlarged view of a portion of the spinner 22 specifically configured for mounting the balance weight 32 (not shown) thereto in accordance with an exemplary embodiment of the present invention. The endwall 22b includes a center hole 22c for receiving the first mounting pin 20c. Similarly, the endwall 34a of the guide wheel 34 illustrated in FIG. 6 includes a center hole 34b for receiving the second mounting pin 20d.

Figure 6:
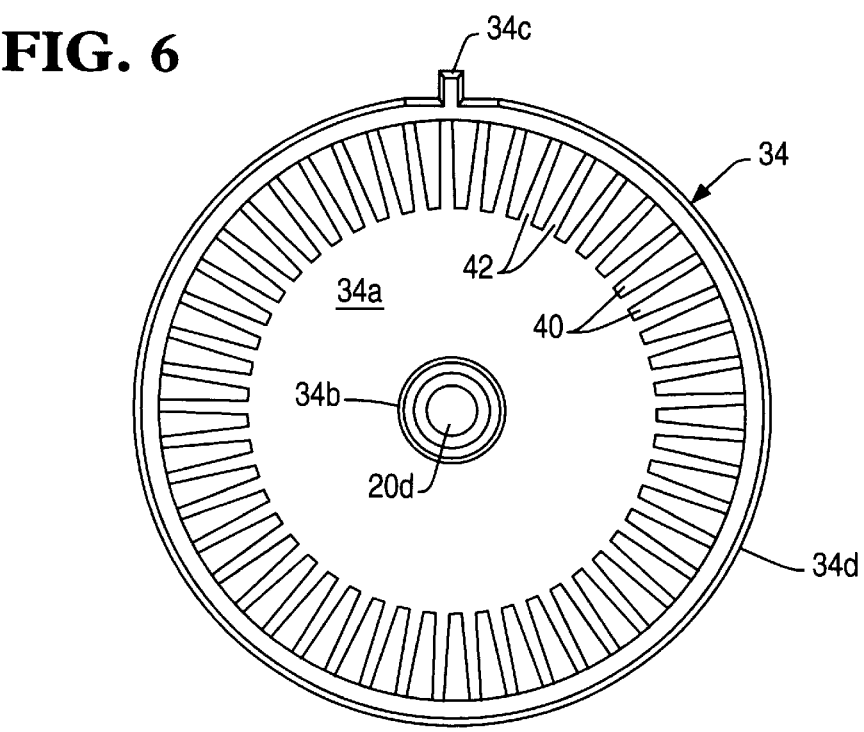
FIG. 6 is an enlarged view of a portion of the guide wheel illustrated in FIG. 4 showing the guide ribs and slots thereof.

In accordance with a preferred feature of the present invention, a plurality of circumferentially spaced apart index or guide ribs 40 are suitably formed on the corresponding endwalls 22b, 34a of both the spinner 22 and guide wheel 34 for readily and accurately circumferentially positioning the corresponding balance weights 32 relative thereto. As shown in FIGS. 5 and 6, the guide ribs 40 define respective pluralities of guide slots 42 circumferentially between respective adjacent ones thereof.

In the preferred embodiment, the spinner 22 and guide wheel 34 may be formed of a suitable plastic which may be conventionally molded during manufacture to additionally provide the corresponding guide ribs 40 extending outwardly therefrom. As shown in FIGS. 3–6, the respective guide ribs 40 preferably extend radially outwardly from the respective center holes 22c, 34b and are spaced radially outwardly therefrom to define respective flat lands for receiving the balance weight 32 thereon. The corresponding guide slots 42 are therefore equi-angularly spaced apart from each other at any suitable value, such as about 10°. In this way, the guide ribs 40 have a symmetrical circular pattern relative to the centerline axis of the shaft 20, and are preferably at the maximum radius within the available space of the respective endwalls 22b, 34a.

Figure 7:
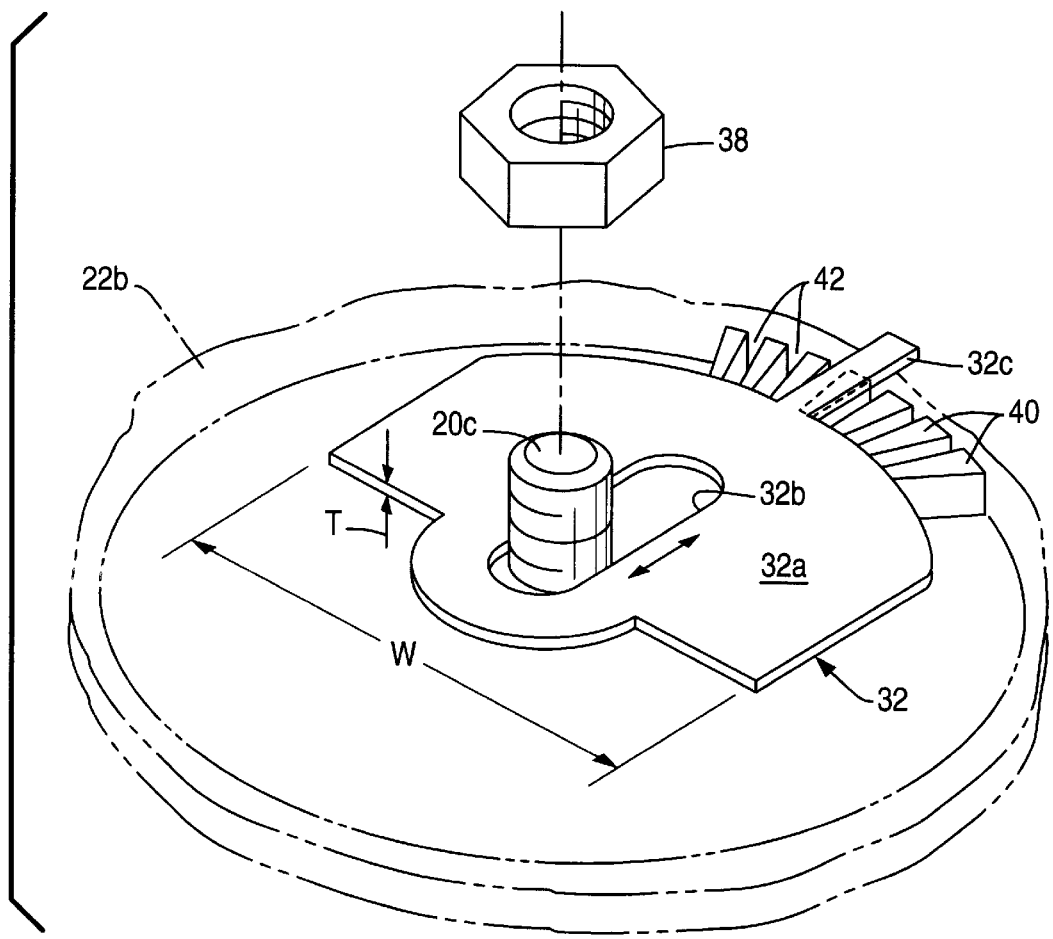
FIG. 7 is a partly exploded view of an exemplary embodiment of a radially and angularly adjustable balance weight engaging the guide ribs of the spinner endwall illustrated in FIG. 3.

An exemplary embodiment of the balance weight 32 is illustrated in FIG. 7 positioned atop the spinner endwall 22b, with a substantially identical balance weight 32 being similarly positioned atop the guide wheel endwall 34a. Each balance weight 3 includes a body 32a having a mounting aperture 32b extending completely therethrough for receiving the corresponding mounting pin 20c,d. The balance weight 32 also includes an elongate guide tab 32c extending outwardly from the body 32a for engaging a complementary guide slot 42.

In the preferred embodiment illustrated in FIG. 7, the balance weight 32 is configured in a unitary or one-piece sheet plate, such as sheet metal, with the body 32a, aperture 32b, and tab 32c collectively being coplanar. The aperture 32b and tab 32c are preferably coaxially aligned with each other on diametrically opposite sides of the body 32a.

In order to effect the required balance at each of the balance planes associated with the endwalls 22b, 34a, the respective guide tabs 32c are manually positioned in selected ones of the guide slots 40 at the closest guide slot 40 to the indicated angular correction positions $P_1$, $P_2$ to correct the measured unbalance. Each balance weight 32 has a known center of gravity which provides a specific correction mass at the angular position effected by the guide tab 32c. The number of guide ribs 40 and corresponding guide slots 42 are preselected for a given application to provide a suitable angular tolerance for angularly effecting the correcting balance. In the exemplary embodiment, the guide slots 42 are 10° apart on centers, and therefore the maximum error in angular position of the balance weight 32 is 5°.

The balance weights 32 illustrated in FIG. 7 are specifically sized and positioned on the respective endwalls 22b, 34a to dynamically balance the rotor 12 at the respective first and second balance planes. This may require an inventory of a plurality of the balance weights 32 of different mass or weight for effecting respective amounts of balance correction in the specific rotor being balanced, such as the spinner rotor 12 illustrated.

In the exemplary embodiment illustrated in FIG. 7, the mounting aperture 32b is preferably elongate, or oval and is colinearly aligned with the guide tab 32c. In this way the balance weight 32 may be radially adjusted in position between the first mounting pin 20c and the selected guide slot 42 to obtain the required correction magnitude expressed in mass-length units. The guide tab 32c readily slides between the adjacent guide ribs 40 for maintaining the same positional angle of the balance weight 32, with the balance weight 32 being manually adjusted in radial position relative to the centerline axis of the shaft 20 which extends through the first mounting pin 20c, to thereby adjust the mass-radial position of the center of gravity of the balance weight 32. When the balance weight 32 is properly positioned, the nut 32 may be installed to clamp the balance weight 32 against the endwall 22b and maintain its accurate fixed position.

As indicated with respect to FIG. 1, the balance machine 10 displays the required balance corrections for the two balance planes of the spinner rotor 12, with corresponding mass-radial position and angular position relative to a common angular reference point. The respective balance weights 32 are then manually mounted atop the spinner 22 and the guide wheel 34, with respective mounting apertures thereof receiving the respective mounting pins 20c, 20d. The respective guide tabs 32c are positioned in selected guide slots 42 associated with the required angular correction positions $P_1$, $P_2$. The respective fasteners 38 are threaded over their mounting pins to fixedly mount the balance weights 32 at the desired radial and angular positions.

The so balanced spinner rotor 12 may then be rotated again in the balance machine 10 to determine the effectiveness of the applied balance weight. If the measured unbalance is not within acceptable limits, either one of the balance weights 32 may be readily adjusted by loosening the nut 38 and adjusting the radial position of the balance weight 32 and then retightening the nut 38. This provides a substantial improvement over using conventional lead tape which must be suitably cut to length and applied, or conventional weighted adhesive which may be incorrectly applied.

Since the exemplary spinner rotor 12 illustrated in FIG. 1 includes generally symmetrical rotating components including the spinner 22, motor 26, and guide wheel 34, the assembly may be initially designed to have a minimum amount of initial unbalance. Accordingly, the expected unbalance of a series of substantially identical spinner rotors 12 should fall within a predetermined limit.

Correspondingly, the expected magnitude of required balance correction at the two balance planes defined by the spinner 22 and the guide wheel 34 would also be within a given range. In this way, the individual balance weights 32 for each of the two balance planes may be initially designed to have suitable amount of mass for effecting suitable balance correction at each of the balance planes.

In the exemplary embodiment illustrated in FIG. 7, the balance weight 32 is preferably a sheet metal component which may be readily and inexpensively produced. It therefore preferably has a constant thickness T determined by the gauge of the sheet metal selected. Although the balance weight 32 may have any suitable configuration to include both the mounting aperture 32b and the in-line guide tab 32c, the preferred sheet metal requirement for the balance weight 32 and available space determine the final configuration thereof.

The guide ribs 40 are formed on the endwall 22b preferably at the maximum available radius within the specific design of the spinner 22. In this way, maximum space is provided between the centerline of the shaft 20 and the guide ribs 40 for mounting the balance weight 32. The balance weight 32 is preferably symmetrical on both sides of the guide tab 32c to provide a center of gravity along the centerline of the balance weight 32 extending through the guide tab 32c. The balance weight therefore has a suitable width W for providing suitable mass to correct expected measured unbalance. The oval mounting aperture 32b allows the center of gravity of the balance weight 32 to be adjusted radially relative to the centerline axis of the shaft 20 so that a single balance weight 32 may be used for effecting a range of balance correction.

Figure 8:
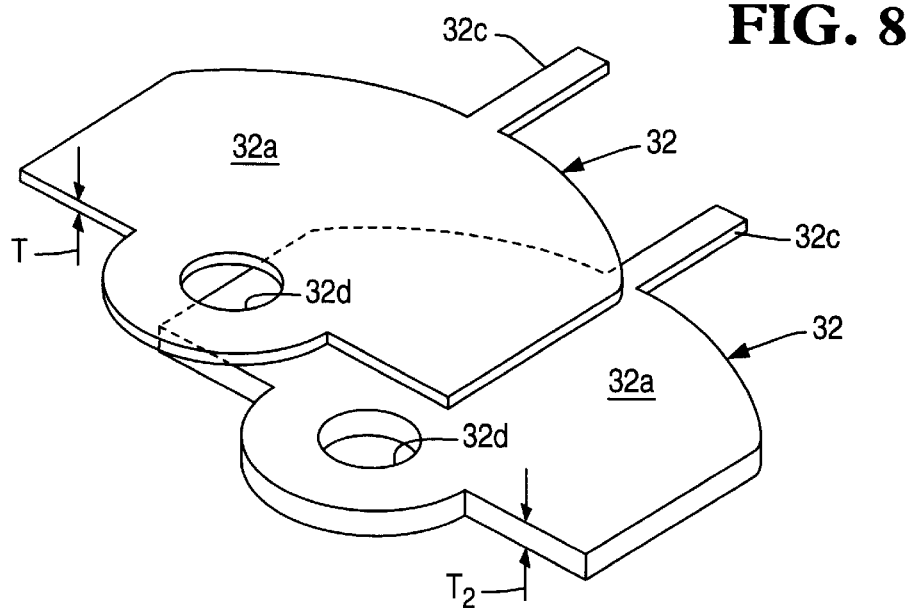
FIG. 8 is an alternate embodiment of the balance weight illustrated in FIG. 7 in the form of two similar balance weights having different thicknesses with circular mounting apertures therein.

FIG. 8 illustrates an alternate embodiment of the balance weight 32 having a circular mounting aperture 32d sized in diameter to closely fit the outer diameter of the respective mounting pins 20c,d to eliminate radial adjustability of the balance weight 32. However, the mounting tab 32c still provides angular adjustability of the balance weight 32 in respective ones of the guide slots 42, with the center of gravity of the balance weight 32 being positioned at a single radial position on the mounting pin.

In this embodiment, one or more of the balance weights 32 may be provided for correcting expected unbalance. The balance weights 32 may have identical thicknesses T, with different balance weights 32 having different widths to provide different correction mass therefor.

Alternatively, the balance weights 32 illustrated in FIG. 8 may be identical in configuration and differ only in thickness, with a second balance weight 32 having a larger thickness $T_2$ for increasing the amount of balance correction. For the exemplary spinner rotor 12 illustrated in FIG. 1, only two balance weights 32 as illustrated in FIG. 8 having two different thicknesses are required in this embodiment for effecting balance correction over the expected amount of unbalance. Either the thin or thick balance weight is installed at the required angular position for effecting dynamic balance at both planes within acceptable limits.

As indicated above, the exemplary spinner rotor 12 illustrated in FIGS. 1–3 includes four exemplary mirrors 24 each having a different inclination angle A which promotes inherent unbalance of the spinner 22. This inherent unbalance may be corrected in part conventionally by suitably varying thicknesses of the walls of the spinner 22 supporting the mirrors 24.

However, in order to provide additional initial balance correction of the spinner 22, it is preferred that one or more of the guide ribs 40 is preferably larger in size, and therefore in mass, than the remainder of the guide ribs 40. The larger guide ribs are designated 40a and are illustrated in FIGS. 1–3 and 5. In the exemplary embodiment illustrated in these Figures, four adjacent ribs have the larger size and are symmetrically disposed at the 12:00 o'clock angular position illustrated. The four large ribs 40a therefore have a center one of the guide slots 42 aligned along a radial axis with the centerline of the shaft 20, which radial axis and center guide slot 42 are disposed perpendicularly to one of the mirrors 24. In this configuration, the four-mirror spinner 22 is more inherently balanced using the additional mass of the large ribs 40a to offset the unbalance due to the different inclination angles of the mirrors 24.

Furthermore, the large ribs 40a also provide a convenient reference point, using the center guide slot 42 thereof, for use in measuring unbalance in the balance machine 10, and in turn positioning the required balance correction.

As shown in FIG. 1, the sensor 10e may be suitably positioned where desired to measure rotational speed of the spinner rotor 12 using a suitable reference point thereon. For example, the reference point may be any one of the guide ribs 40, such as the large ribs 40a having suitable contrast for being detected by the optical sensor 10e.

In the preferred embodiment illustrated in FIG. 1, the guide wheel 34 preferably includes a discrete timing or reference rib 34c, illustrated also in various views in FIGS. 2, 4, and 6. As shown in FIG. 6 in most detail, the timing rib 34c is preferably radially aligned with a respective one of the guide ribs 40 for providing an angular reference for positioning both the first and second balance weights 32 on the spinner 22 and the guide wheel 34, respectively. The timing rib 34c has suitable contrast for being readily detected by the optical scanner 10e positioned in FIG. 1 as it rotates during testing. Also in the preferred embodiment illustrated in FIGS. 1 and 2, the timing rib 34c is preferably coaxially aligned with the center guide slot 42 of the spinner large ribs 40a.

In this way, balance correction is shown in the display 10d relative to a common reference point associated with the timing rib 34c on the guide wheel 34, and the center guide slot 42 on the spinner 22. The required balance corrections 32 may be readily effected by determining angular position relative to these reference points to identify the corresponding guide slots 42 in which are positioned the respective mounting tabs 32c of the balance weights 32. If desired, numerical angular positions covering the range of 0°–360° may be suitably imprinted on the spinner 22 and guide wheel 34 adjacent the respective guide slots 42 for facilitating the mounting of the balance weights 32.

The guide wheel 34 illustrated in FIG. 6 is substantially symmetrical in circular configuration with equi-angularly spaced part guide ribs 40 of identical shape. By adding the discrete timing rib 34c, the guide wheel 34 is rendered inherently unbalanced thereby. Accordingly, suitably means are provided for reducing initial unbalance of the guide wheel 34 due to the timing rib 34c formed on the wheel guide ribs 40.

For example, the guide wheel 34 illustrated in FIG. 6 preferably includes an annular perimeter wall 34d which circumferentially surrounds the wheel guide ribs 40 and allows the guide ribs 40 to be axially recessed relative thereto for additionally reducing windage losses during rotation. The perimeter wall 34b preferably has a constant thickness around the circumference of the wheel, except at the timing rib 34c integrally formed thereon. The timing rib 34c preferably extends radially outwardly from the perimeter wall 34d, and by locally reducing the thickness of the perimeter wall symmetrically on both sides of the timing rib 34c, the collective weight at this region is balanced by the weight of the perimeter wall 34d diametrically oppositely therefrom.

In an alternate embodiment (not shown), one or more of the guide ribs 40 diametrically opposite from the timing rib 34c may be enlarged for offsetting the unbalance caused by the timing rib 34c itself. And, other provisions may be provided to provide inherent balancing of the guide wheel 34 with the protruding timing rib 34c if desired.

The specifically configured balance weight 32 described above requires minimum modifications of the original spinner rotor 12 for use therewith. The balance weight 32 may take various configurations including the mounting aperture and tab thereof for use in adjusting radial and circumferential portion of the balance weight relative to the rotor. The guide ribs 40 may be readily molded in the plastic components comprising the spinner 22 and guide wheel 34, or may be otherwise formed on the rotor for suitably mounting the cooperating adjustable balance weight 32 thereon. The guide ribs 40 provide convenient and accurate structure for adjusting the angular position of the balance weight 32, as well as preventing circumferential movement thereof when mounted. The circular mounting aperture 32*d* embodiment of the balance weight 32 illustrated in FIG. 8 eliminates radial adjustment of the balance weight, which may instead be effected by providing differently sized balance weights instead. The oval mounting aperture 32*b* embodiment of the balance weight illustrated in FIG. 7 additionally allows radial adjustment of the balance weight where desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. An adjustable balance weight for balancing a rotor, comprising a body having a mounting aperture extending therethrough for receiving a mounting pin of said rotor; and a guide tab extending from said body for engaging a complementary radial guide slot of said rotor.

2. A balance weight according to claim 1 wherein said guide tab extends radially outwardly from said aperture for engaging said guide slot.

3. A balance weight for balancing a rotor, comprising a body having a mounting aperture extending therethrough for receiving a mounting pin of said rotor; a guide tab extending from said body for engaging a complementary guide slot of said rotor; and being configured in a unitary sheet plate, with said body, aperture, and tab being coplanar, and said aperture and tab being coaxially aligned on opposite sides of said body.

4. A balance weight according to claim 3 in combination with said rotor, with said rotor further comprising:
   a shaft having first and second opposite ends, with said mounting pin being defined at said first end;
   a spinner fixedly joined to said shaft first end for rotation therewith, said spinner having an endwall disposed coaxially about said shaft for defining a first balance plane, and said endwall having said mounting pin at a center thereof, and further having a plurality of circumferentially spaced apart guide ribs defining a plurality of said guide slots between adjacent ones of said ribs;
   said balance weight being mounted atop said spinner endwall as a first balance weight, with said mounting aperture receiving said mounting pin, and said guide tab being positioned in one of said guide slots for restraining circumferential movement thereof; and
   a fastener removably joined to said mounting pin for fixedly mounting said balance weight to said spinner.

5. A rotor according to claim 4 wherein said spinner guide ribs extend radially outwardly from said endwall center, and are spaced radially therefrom in a symmetrical circular pattern, and said corresponding guide slots are equiangularly spaced apart from each other.

6. A rotor according to claim 5 wherein said spinner further comprises:
   a plurality of circumferentially adjoining sidewalls joined together at said endwall;
   a plurality of mirrors fixedly joined to respective ones of said sidewalls; and
   said balance weight is sized and positioned on said spinner endwall to balance said rotor at said first balance plane.

7. A rotor according to claim 6 wherein:
   each of said mirrors is inclined on said spinner sidewalls at different inclination angles in unbalance with each other; and
   a plurality of said guide ribs are sized larger in mass than adjacent ones of said ribs to reduce said mirror unbalance.

8. A method of balancing said rotor of claim 6 comprising:
   rotating said rotor without said balance weight;
   measuring unbalance of said rotor at said first balance plane to determine magnitude and angular position of correction therefor; and
   mounting said balance weight on said spinner endwall, with said guide tab being positioned in a selected guide slot at about said correction angular position to correct said measured unbalance.

9. A method according to claim 8 wherein:
   said mounting aperture in said balance weight is elongate; and
   said balance weight is radially adjusted in position between said mounting pin and said selected guide slot to obtain said correction magnitude.

10. A rotor according to claim 6 wherein said mounting aperture in said balance weight is elongate in line with said guide tab for radially adjusting position of said balance weight on said spinner endwall.

11. A rotor according to claim 6 wherein said mounting aperture in said balance weight is circular for positioning said balance weight at a single radial position on said mounting pin.

12. A rotor according to claim 6 further comprising:
   a guide wheel fixedly joined to said shaft second end for rotation therewith, said guide wheel having a second endwall disposed coaxially about said shaft for defining a second balance plane, and said second endwall having a center hole receiving a second mounting pin defined at said shaft second end, and further having a plurality of circumferentially spaced apart second guide ribs defining a plurality of second guide slots between adjacent ones thereof; and
   a second one of said balance weights being mounted atop said wheel endwall, with said mounting aperture thereof receiving said second mounting pin, and said second guide tab thereof being positioned in one of said second guide slots for restraining circumferential movement thereof.

13. A rotor according to claim 12 wherein said guide wheel further includes a timing rib radially aligned with a respective one of said second guide ribs for providing an angular reference for positioning both said first and second balance weights on said spinner and guide wheel, respectively.

14. A method of balancing said rotor of claim 13 comprising:

rotating said rotor without said balance weights;

measuring unbalance of said rotor at both said first and second balance planes to determine magnitude and angular position of corrections therefor; and mounting said balance weights on said spinner endwall and said guide wheel endwall, with said guide tabs being positioned in selected guide slots at about said correction angular positions to correct said measured unbalance at said two balance planes.

15. A method according to claim 14 wherein:

said mounting apertures in said balance weights are elongate; and said balance weights are radially adjusted in position between said mounting pins and said selected guide slots to obtain said correction magnitudes.

16. A rotor according to claim 13 further comprising means for reducing unbalance due to said timing rib on said wheel guide ribs.

17. A rotor according to claim 16 wherein said unbalance reducing means comprise an annular perimeter wall circumferentially surrounding said wheel guide ribs, and having a reduced thickness at said timing rib, with said timing rib extending radially outwardly from said perimeter wall.

18. A rotor according to claim 13 further comprising a motor operatively joined to said shaft at said second end thereof for rotating together said spinner and guide wheel.

19. A balanced rotor comprising:

a rotor shaft;

an endwall disposed coaxially about said shaft for rotation therewith, and having a plurality of circumferentially spaced apart guide ribs;

a balance weight having a guide tab positioned between adjacent ones of said guide ribs; and means for mounting said balance weight to said endwall.

20. A rotor according to claim 19 wherein:

said shaft includes a mounting pin; and said weight includes an aperture receiving said pin, with said aperture and tab being coplanar.

\* \* \* \* \*